United States Patent [19]
Adamson et al.

[11] Patent Number: 5,538,027
[45] Date of Patent: Jul. 23, 1996

[54] PRESSURE BALANCING FOAM VALVE

[76] Inventors: Keith W. Adamson, 26711 Estanciero Dr., Mission Veijo, Calif. 92691; John R. Grindley, 3809 Via Manzana, San Clemente, Calif. 92673

[21] Appl. No.: 420,346

[22] Filed: Apr. 11, 1995

[51] Int. Cl.⁶ ............................................. G05D 11/03
[52] U.S. Cl. .................. 137/7; 137/101.11; 137/564.5; 137/895
[58] Field of Search ..................... 137/7, 101.11, 137/564.5, 599.1, 895

[56]  References Cited

U.S. PATENT DOCUMENTS

| | | | |
|---|---|---|---|
| 2,873,758 | 2/1959 | Nielson | 137/895 X |
| 3,473,481 | 10/1969 | Brane | 137/895 X |
| 4,064,891 | 12/1977 | Eberhardt | 137/98 |
| 4,448,256 | 5/1984 | Eberhardt et al. | 169/15 |
| 4,633,895 | 1/1987 | Eberhardt | 137/98 |
| 4,974,634 | 12/1990 | Agulia | 137/564.5 |
| 5,009,244 | 4/1991 | Grindley | 137/101.11 |
| 5,165,442 | 11/1992 | Fiala | 137/118 |
| 5,427,151 | 6/1995 | Pauley | 137/895 |

*Primary Examiner*—Robert G. Nilson
*Attorney, Agent, or Firm*—Christie, Parker & Hale

[57] ABSTRACT

A pressure balancing foam valve includes a body having a liquid inlet at one end and a liquid outlet at an opposite end, and having an annular passage therethrough. A first stage pressure regulating assembly is disposed within the annular passage of the valve and includes a shaft that is attached at a first end to the liquid inlet. A one-piece pressure disc is slidably disposed on the shaft. The disc is urged into a seated position against an end portion of the liquid inlet by a spring interposed between the pressure disc and a second end of the shaft. The spring is selected so that the pressure disc is placed into the seated position during low pressure conditions to prevent liquid flow through the valve, and to permit compression by force of the disc from increasing liquid pressure to unseat the disc and permit liquid flow through the valve. A second stage pressure regulator is a venturi-shaped annular passage through a wall portion of the liquid outlet. A high-pressure inlet port is disposed through a wall portion of the liquid inlet, and a foam outlet port is disposed through a wall portion of the liquid outlet. The high-pressure inlet and foam outlet ports are connected to a foam delivery system. The pressure disc and venturi together provide a differential pressure within the valve proportional to changing liquid flow rate and pressure, thereby ensuring a desired degree of foam pressurization and accurate foam delivery into the liquid at low to high volumetric flow rates.

19 Claims, 8 Drawing Sheets

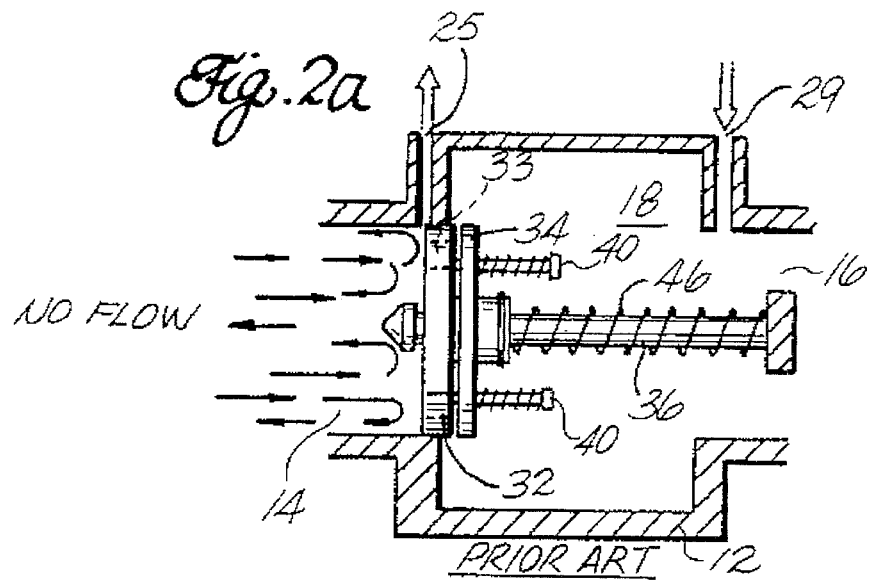
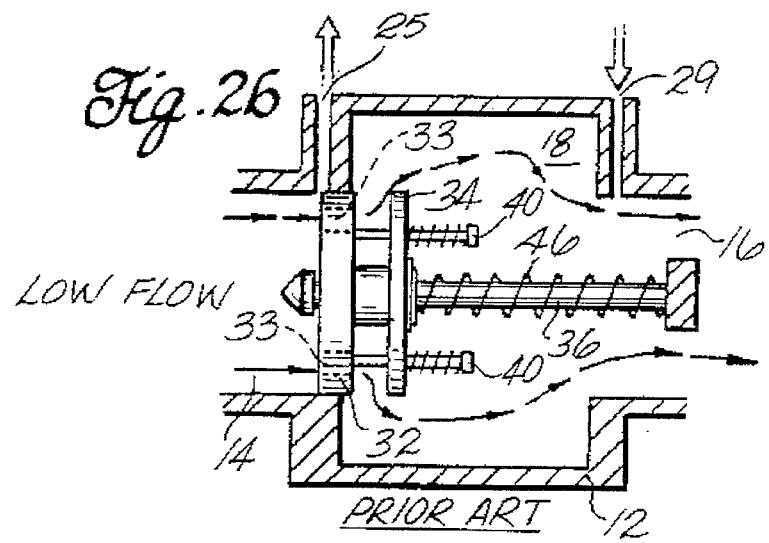
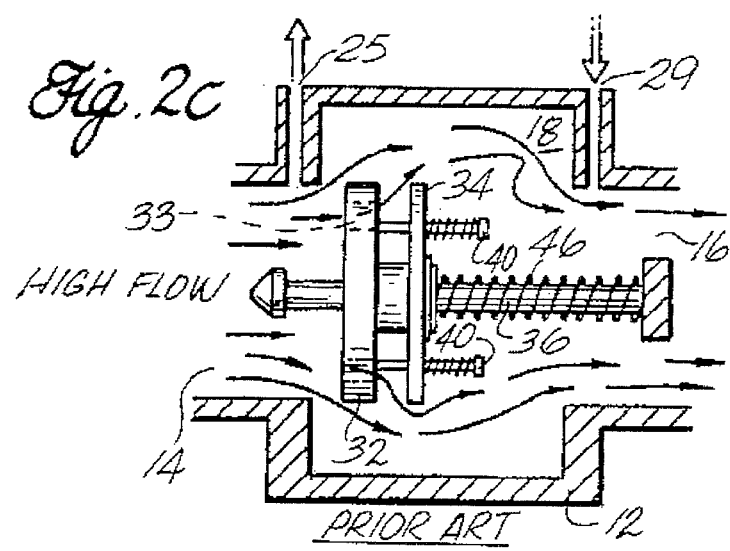

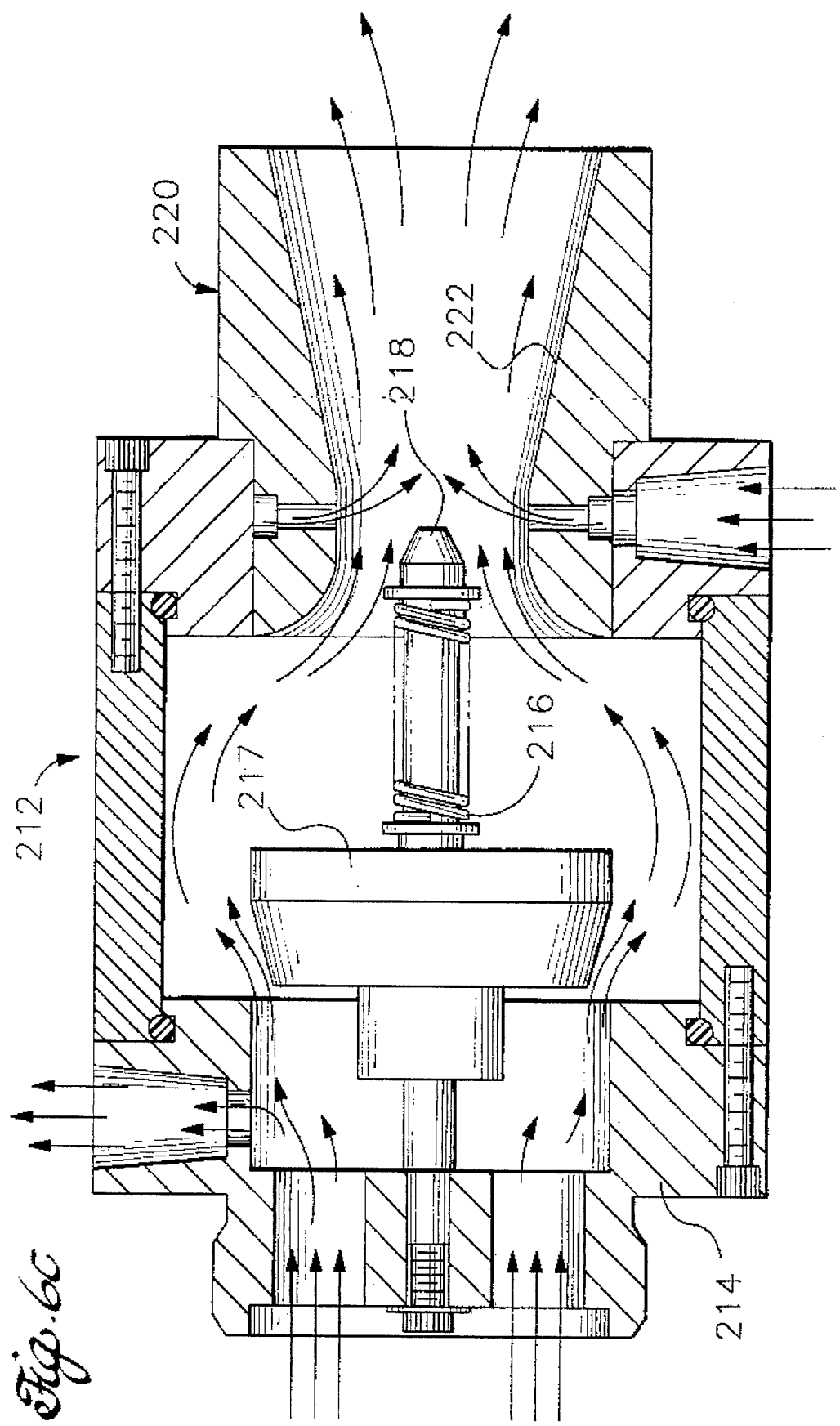

PRESSURE BALANCING FOAM VALVE

FIELD OF THE INVENTION

The present invention relates generally to valves used for delivering foam into a liquid stream and, more particularly, to a differential valve for delivering a precise amount of fire-fighting foam into a water stream operating at various volumetric flow rates.

BACKGROUND OF THE INVENTION

The addition of foaming agents to fire-fighting water as a fire suppression agent has been recognized as early as the 1870s, when the first such use was reported to have been patented in England. Since then, through the years, further advances have been made. These advances have included better understanding of the function of the foaming agent, the type of delivery system needed to dispense and handle the foaming agent and, most significantly, the foam-to-water ratio for particular fire applications.

For many years, Class A type fire-fighting foams of the A-FFF type have never been used to combat fuel fires such as JP4 jet fuel, gasoline and diesel fuels. More recently, however, Class A foams, such as the agents sold under the trademark Sylvex of the Ansul Company, have been found to increase the fire suppression efficiency of water from three to up to nine times when used on wild land, Class A structure fires, and on hydrocarbon fires. This recognition has greatly expanded the utility and usage of foam as an efficient fire-fighting agent.

In the past, a fairly standard foam-to-water ratio of 6:94, or 6 parts foam to 94 parts water, was used and an apparatus capable of maintaining such a ratio at various water volumetric flow rates was disclosed in a number of patents, such as U.S. Pat. No. 4,064,891 to Eberhart and U.S. Pat. No. 4,448,256 to Eberhart, et al. The '891 patent to Eberhart discloses a balanced pressure valve. The '256 patent to Eberhart, et al., employs a positive displacement gear pump to maintain the standard ratio of foam to water despite changes in water volumetric flow rates.

Most recently, it has been recognized that the foam-to-water ratio of 3:97 over water volumetric flow rate variations from 20 to 1,000 gallons per minute (GPM) were needed, along with a more complex proportioning valve to ensure a stable foam-to-water ratio over the wide volumetric flow rate. U.S. Pat. No. 4,633,895, also to Eberhart, discloses a proportioning valve comprising a shuttle-type system for accommodating such foam-to-water ratio over the above-identified volumetric flow rate. However, with further development of foam suppression fire-fighting, it became apparent that foam-to-water ratios as low as 0.2:99.8 were needed and precise proportioning at 0.2% increments up to a foam-to-water ratio of 1:99 could be important in various applications.

U.S. Pat. No. 5,165,442 to Fiala discloses a differential valve for accommodating the mixing of foam and water at ratios as low as 0.2% and as high as 1%, in 0.2% increments. Generally speaking, the differential valve is constructed having an internal mechanism that produces a pressure drop or reduction in pressure through the valve, between the water inlet and water outlet, which increases in proportion to an increase of water through the valve. The pressure differential that is produced by the valve is used to pressurize foam, contained in an external foam dispensing tank and the like, for delivery at a preset ratio into the water stream passing through the valve. However, it has been discovered that at increasing water flow rates above about 150 GPM the delivery ratio of foam to water does not remain constant but, rather, varies from the desired constant ratio and is unpredictable. The inability of the differential valve to provide a desired consistent delivery ratio of foam to water at volumetric flow rates greater than about 150 GPM adversely affects the fire-fighting efficiency of the foam-water system.

With further development of foam suppression fire-fighting, it has become apparent that foam-to-water ratios as low as 0.1:99.9 may be needed in certain applications, and precise proportioning of foam to water up to a 1:99 ratio could be important in various applications under various water volumetric flow rates that include volumetric flow rates greater than 150 GPM, i.e., at volumetric flow rates where other known differential valves are usable to provide an accurate proportion of foam to water.

It is, therefore, desirable that a differential valve for delivering foam into a liquid stream be constructed in a manner that produces a predictable and controlled pressure differential, between the inlet and outlet of the valve in liquid passing through the valve, under a wide range of flow rate conditions to facilitate accurate foam delivery from the valve into the liquid passing therethrough. It is desirable that a differential valve be constructed so that it is compatible with existing foam-water delivery systems. It is also desirable that a differential valve be constructed from relatively conventional materials using conventional manufacturing techniques, comprise a minimum number of moving parts, and be simple to operate.

SUMMARY OF THE INVENTION

There is, therefore, provided in practice of this invention a differential or pressure balancing foam valve that is constructed in a manner that produces a predictable and controlled pressure differential, i.e., pressure drop, within the valve between a high-pressure inlet port and a foam outlet port with changing inlet liquid conditions to ensure accurate foam delivery into liquid passing through the valve and a constant foam to liquid proportion. A pressure balancing foam valve constructed according to principles of this invention includes a body having an liquid inlet at one end and a liquid outlet at an opposite end, and having an annular passage therethrough. In a preferred embodiment, the body is formed from a three-piece construction comprising an inlet body portion, a central body portion, and an outlet body portion that are each connected together.

A first stage pressure regulating assembly is disposed within the annular passage of the valve and includes a shaft that extends axially within the annular passage and is attached at a first end to a web portion of the inlet body portion. A one-piece pressure disc having a central opening therethrough is slidably disposed on the shaft and is urged against an end portion of the inlet body annular passage by means of a spring interposed between the pressure disc and a second end of the shaft. It is desired that the spring be selected to urge the pressure disc into a seated position against the end portion of the inlet body annular passage during low flow conditions to prevent liquid flow through the annular passage and the valve. The spring is also selected to permit compression by force of the pressure disc from increasing liquid flow rate to thereby unseat the pressure disc and permit liquid flow through the annular passage and the valve. The pressure disc produces a differential pressure or pressure drop within the valve between the liquid inlet and outlet and, more specifically between a high-pressure inlet port and a foam outlet port, by restricting the passage of liquid thereby.

The valve includes a second stage pressure regulator comprising a venturi-shaped annular passage through the outlet body that also produces a differential pressure or pressure drop within the valve between the liquid inlet and outlet by the passage of liquid therethrough.

The inlet body includes a liquid outlet portion that is not restricted by seated placement of the pressure disc and that is hydraulically connected to a foam delivery system comprising a foam tank and the like to pressurize the foam within the tank. The outlet body includes a plurality of foam injection ports disposed therein that are positioned circumferentially around a throat portion of the venturi. The foam injection ports are connected to a foam injection manifold within the outlet body that facilitates passage of foam introduced into the valve through a foam outlet port, disposed through the outlet body, to the foam injection ports to effect foam dispersement into liquid passing through the valve.

The pressure disc and venturi act together to provide a proportional change in differential pressure within the valve, between the high-pressure inlet port and the foam outlet port, with changing liquid flow rate and pressure to ensure a desired degree of foam pressurization and, therefore, accurate foam delivery into the liquid at various volumetric flow rates to ensure a constant and predictable foam to water ratio.

BRIEF DESCRIPTION OF THE DRAWINGS

These and other features and advantages of the present invention will become appreciated as the same becomes better understood with reference to the specification, claims and drawings wherein:

FIGS. 2a–2c are fragmentary sectional views of the prior art differential valve of FIG. 1, showing different operating positions for flow responsive elements of the differential pressure valve;

FIGS. 6a–6c are fragmentary sectional views of the pressure balancing foam valve of FIG. 3, showing different operating positions for a first stage pressure regulating assembly.

DETAILED DESCRIPTION

Figure 1:
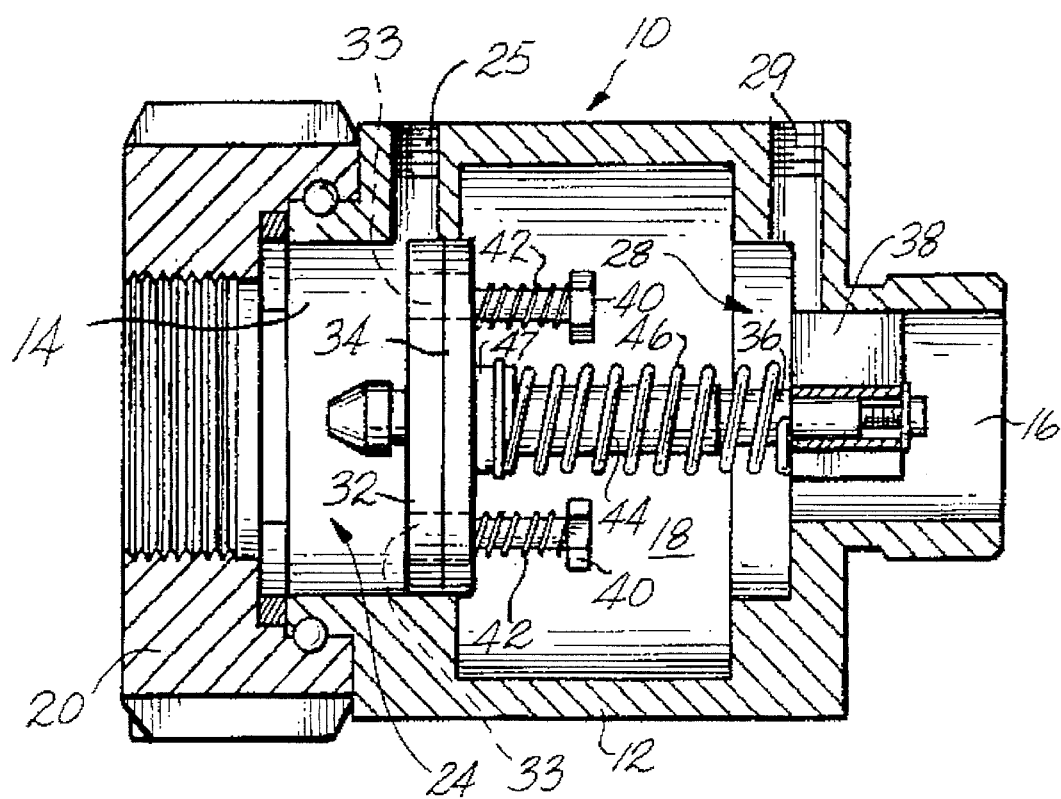
FIG. 1 is a vertical sectional view of a prior art differential valve disclosed in U.S. Pat. No. 5,165,422.

A differential valve for delivering fire-fighting foam into a water stream is disclosed in U.S. Pat. No. 5,165,442 to Fiala, and is illustrated in FIG. 1. The differential valve 10 comprises a one-piece body 12 constructed from a suitable structurally rigid material. The body 12 comprises a water inlet at a first end 14 and a water outlet at an opposite second end 16. The body comprises a centrally disposed inner chamber 18 extending from the first end 14 to the second end 16. The first end and second end are configured, around an outside surface, to accommodate attachment with conventional hydraulic or fire-fighting-type fittings. More specifically, the first end 14 has an exterior surface configured to accommodate attachment with a coupling ring 20.

The internal cavity includes a high-pressure section 24 adjacent the first end 14 that communicates with a high-pressure annular fitting 25 that extends through a wall portion of the body. A low-pressure section 28 of the inner chamber 18 is disposed adjacent the second end 16 and communicates with a low-pressure annular fitting 29 that extends through a wall portion of the body. A high-pressure plate 32 and a low-pressure plate 34 are disposed centrally within the inner chamber 18 and are slidably displaceable within the chamber via a centrally mounted pressure plate shaft 36. The pressure plate shaft 36 is fixedly attached to a web portion 38 of the body 12 that extends diametrically across the second end 16.

As shown in FIGS. 1, 2a–2c, the high-pressure plate 32 has a number of openings 33 that extend axially through the high-pressure plate, i.e., are oriented parallel with the pressure plate shaft 36. The low-pressure plate 34 includes two diametrically opposed bolts 40 that each extend through axially oriented openings (not shown) in the low-pressure plate surface and are threadably engaged with the high-pressure plate 32. Springs 42 are disposed around outside diameters of the bolts 40 and extend from a head portion of each bolt to a facing surface of the low-pressure plate. Configured in this manner, the low-pressure plate 34 is permitted to move under spring compression axially away from the low-pressure plate.

The pressure plate shaft 36 comprises a shaft bushing 44, disposed around an outside surface of the shaft, and a spring 46 disposed around an outside surface of the shaft bushing 44. The spring 46 extends from the web portion 38 of the second body end 16 to a shoulder bushing 47 that is disposed within a central opening (not shown) through the low-pressure plate 34. Accordingly, when installed on the shaft 36, the high-pressure plate 32 and the shaft bushing 44 is permitted to move axially along the shaft, which slidable movement is controlled by compression action of the spring 46. Additionally, the low-pressure plate 34 is permitted to move axially along the shaft 36 and the shaft bushing 44, which slidable movement is controlled by compression action of the springs 42 between the surface of the low-pressure plate and the bolts 40.

The high-pressure plate 32 and low-pressure plate 34 are disposed within the inner cavity 18 such that an outer diameter of each pressure plate communicates with an adjacent wall portion of the body 12. The outer diameter of the high-pressure plate 32 partially obstructs an entrance to the high-pressure fitting 25. Accordingly, as low pressure water enters the first end 14, a portion of the entering water is obstructed by the surface of the high-pressure plate 32 and is directed into the high-pressure fitting 25. Water leaving the high-pressure fitting is directed to a bladder or other type of foam dispenser (see for example FIG. 5) for effecting the dispersement of foam therefrom. If the pressure of the water entering the first body end 14 is less than a threshold pressure, neither the low pressure plate 34 nor the high-pressure plate 32 will be slidably displaced along the pressure plate shaft 36 to facilitate passage of water through the body and, therefore, will act as a check valve, as shown in FIG. 2a. This condition is referred to as a "no flow" condition.

As the pressure of the water entering the first body end 14 increases, water will pass through the openings 33 that extend through the high-pressure plate 32 and impinge on the low-pressure plate 34, causing the low-pressure plate to be slidably displaced along the pressure plate shaft 36 and spring retaining bolts 40 away from the high-pressure plate 32, as shown in FIG. 2b. Under such low pressure low flow conditions, foam dispensed from the foam dispenser is routed through a metering valve (not shown) to the low-pressure fitting 29 where the foam is delivered into the low-pressure section of the inner chamber 18 valve body 12 adjacent the second end 16 and is mixed with the exiting water. This condition is referred to as a "low flow" condition.

As the pressure of the water entering the first body end 14 increases, the water continues to pass through the openings 33 in the high-pressure plate 32 until the pressure force of the water impinging against a surface portion of the high-pressure plate 32 and the surface of the low-pressure plate 34 is sufficient to cause both the high-pressure plate 32 and low-pressure plate 34 to be slidably displaced along the pressure plate shaft 36 towards the second body end 16, as shown in FIG. 2c. Under such high-pressure conditions, the water is allowed to flow both through the openings 33 in the high-pressure plate 32 and over the outside diameter of the high-pressure plate. In this position, the outer diameter of the high-pressure plate 32 is positioned away from the wall portions of the valve body 12. This condition is referred to as a "high flow" condition.

As the pressure of the water entering the first body end 14 increases, the high-pressure plate 32 and low-pressure plate 34 both continue to be slidably displaced along the pressure plate shaft 36 according to the particular spring constant of the spring 46. As the flow rate and pressure of the water passing through the valve body 12 increases, it is desired that the differential pressure of the water between the high-pressure fitting 25 and low-pressure fitting 29 also increase a proportional amount, thereby ensuring that a constant proportion of foam is dispensed into the water stream.

The construction of the above-described valve makes it difficult, if not impossible, to provide a constant proportion of foam with increasing water flow rate and pressure due to the spring-controlled action of the high and low pressure plates. When the flow rate and pressure of the water entering the valve is at a medium to high flow condition, the spring tension of the spring 36 imposes a force against the high and low pressure plates in a direction toward the first body end 14 to resist the force of the water acting on the plates. The position of the plates within the inner chamber 18 imposes a flow restriction on the water passing through the valve, thereby creating a pressure differential or pressure drop between the first and second ends 14 and 16, respectively, and differential pressure between the high and low pressure fittings. As the plates are moved further toward the second end 16, in response to increasing water flow rate and pressure, it is desired that the pressure differential also increase a proportional amount to provide a constant proportion of foam dispersement.

At medium to high water flow rates and pressures, however, the above-identified spring-controlled mechanism is unable to provide a consistent proportion of foam dispersement because of fluctuations in the positioning of the high-pressure plate 32 and low-pressure plate 34 inherent in an exclusively spring-controlled pressure plate mechanism. For example, binding of the spring 46 relative to the pressure plate shaft 36 and shaft bushing 44 can adversely affect the axial displacement of the high-pressure plate 32 and low-pressure plate 34 during operation and, thereby, produce unwanted variations in the differential pressure between the high-pressure fitting 25 and low-pressure fitting 29. For example, it has been discovered that the spring-controlled mechanism is unable to provide a predictable and controlled differential pressure at pressures greater than approximately 150 GPM.

Additionally, fluctuations in the flow rate of water entering the valve can, in some instances, effect a harmonic oscillation of the high-pressure plate 32 and low-pressure plate 34 vis-a-vis the pressure plate shaft 36, thereby also producing unwanted uncontrollable variation in the pressure differential between the high-pressure fitting 26 and low-pressure fitting 30. Also, at very high water flow rates and pressures the high and low pressure plates can completely compress the spring, thereby completely disabling the valves differential pressure regulating mechanism.

Figure 3:
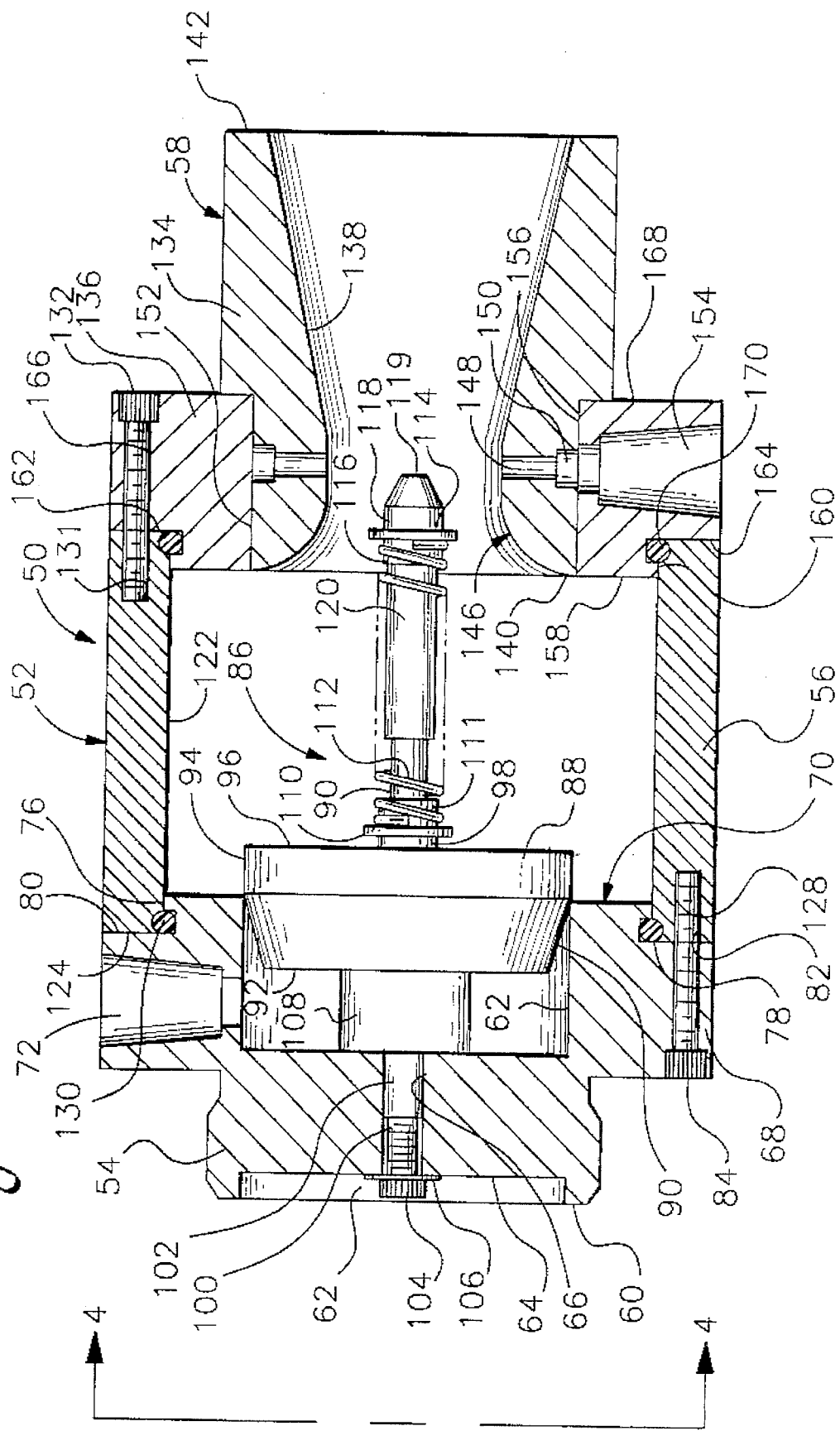
FIG. 3 is a vertical sectional view of a pressure balancing foam valve constructed according to principles of this invention.

Referring now to FIG. 3, a pressure balancing foam valve 50 constructed according to principles of this invention has a housing body 52 with a three-piece construction comprising an inlet body portion 54, a central body portion 56, and an outlet body portion 58. The housing body has a generally cylindrical outside surface configuration.

The inlet portion 54 includes a first end 60 having an outside surface configured to accommodate connection with a number of conventional hydraulic fittings, such as hose threads, pipe threads, quick connects, vitaculic fittings and the like. The three-piece body construction permits the valve to be assembled with differently configured inlet portions to facilitate use of the valve with such different inlet connections without having to construct and entirely different housing body, thereby maximizing application of the valve with a number differently configured liquid/foam systems. The inlet portion 54 may be constructed from a suitable structurally rigid material such as steel, steel alloy, aluminum and the like. It is desired that the selected material be both corrosion and chemically resistant. In a preferred embodiment, the inlet portion is formed from a hard anodized aluminum such as 6061 that has a Rockwell C hardness of approximately 80. Aluminum is a preferred material because of its corrosion resistance and because it is not etched by contact with Class A foam.

Figure 4:
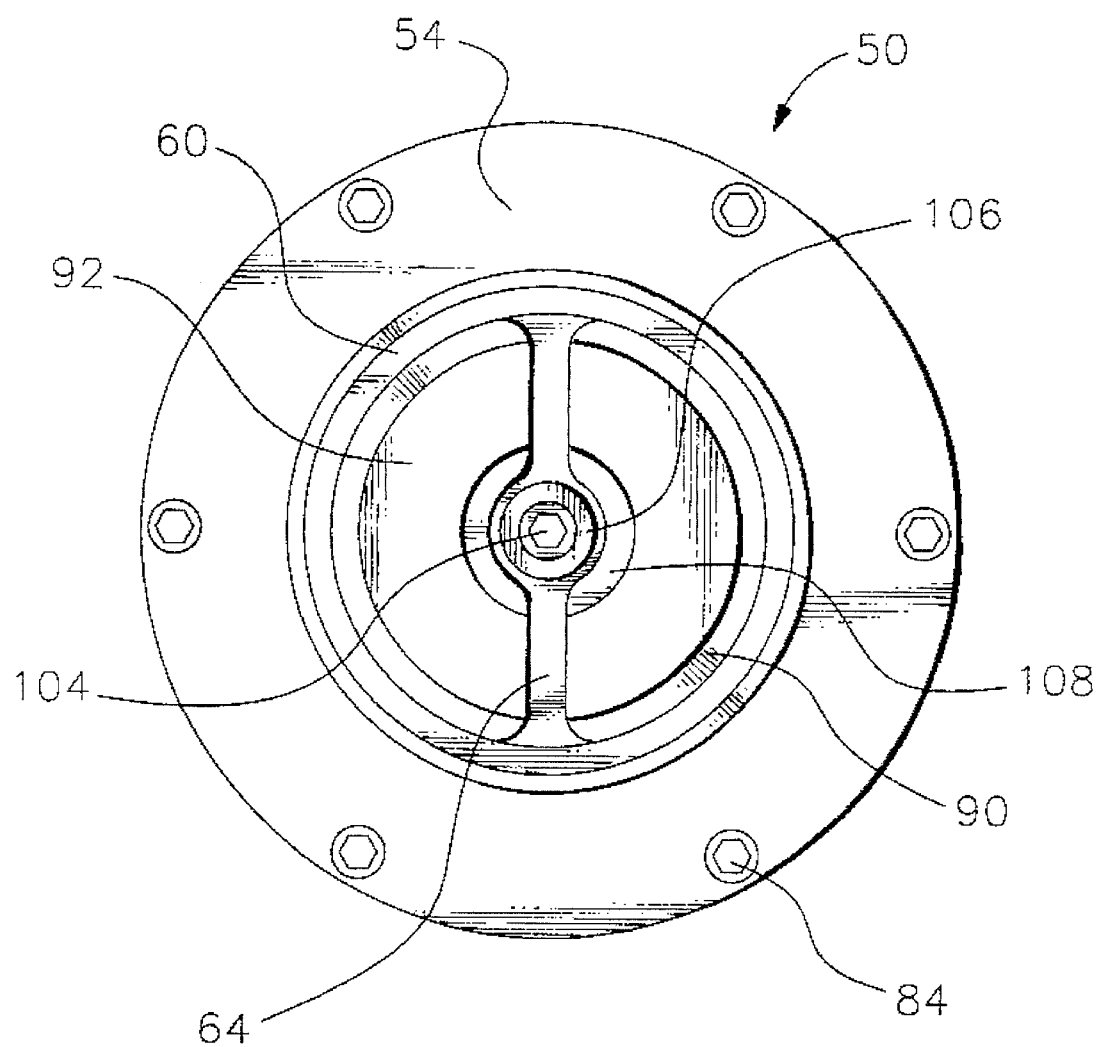
FIG. 4 is an end view of the pressure balancing foam valve in FIG. 3 at section 4—4.

The inlet portion 54 includes an annular passage 62 that extends therethrough. As shown in FIGS. 3 and 4, a web 64 extends across an inside diameter of the annular passage 62 adjacent an opening of the first end 60 so that water entering the inlet portion passes through the annular passage 62 on both sides of the web 64. The web extends axially about midway into the annular passage from the first end 60. The web has an opening 66 that is centrally positioned and extends therethrough along an axis running along the annular passage. As discussed below, the opening 66 accommodates attachment with an end of a pressure disc.

The outside surface of the inlet portion includes an enlarged diameter section 68 that extends axially from a second end 70 a distance toward the first end 60. The enlarged diameter section has an outside diameter approximately equal to an outside diameter of the central body portion 56. A high-pressure inlet port 72 extends radially through a wall portion of the enlarged diameter section 70 from the annular passage 62 to the outside surface of the inlet portion 54. The high-pressure inlet port 72 may be configured internally to accommodate connection with conventional pipe or hose attachments, such as threaded attachment and the like. The second end 70 extends radially from a terminal edge of the annular passage 62 to an outer lip 76, defining a flat surface therebetween. The surface defined by the second end 70 is perpendicular to an axis running along the annular passage 62.

The outer lip 76 extends circumferentially around an outside surface of the second end 70 and includes a groove 78 that extends circumferentially a depth within the lip. An edge portion 80 is positioned adjacent the groove 78 and extends radially from the groove to the outside surface of the enlarged diameter section 68. The edge portion 80 is a flat surface that accommodates abutting placement against a complementary edge portion of the central body portion 52 during attachment therewith. The inlet body portion 54 includes a number of openings 82 that each extend axially through the enlarged diameter section 68 and are positioned near a outside surface. In a preferred embodiment, the inlet portion 54 includes approximately six openings 82. The openings 82 are sized to accommodate placement of attachment bolts 84 therethrough.

In a preferred embodiment of the inlet body portion 54, the first end 60 has an outside diameter of approximately 2.875 inches, the annular passage 62 has a diameter of approximately 2.5 inches and a length of approximately 2.5 inches. The web 64 has a thickness of approximately 0.25 inches and extends an axial distance into the annular passage of approximately 0.875. The web opening 66 has a diameter of approximately 0.375 inches. The high-pressure inlet port 72 has a tapered configuration with a diameter of approximately 0.5 inches at the annular passage 62 and a diameter of approximately 0.75 inches at the outside surface. The lip 76 has a diameter of approximately 3.75 inches, and the groove extends radially inward a depth of approximately 0.125 inches. The bolt openings 82 have a diameter of approximately 0.257 inches and are arranged at six equidistant locations near the outside surface of the enlarged diameter section 68.

A first stage pressure regulating assembly 86 includes a pressure disc 88 that is slidable displaceable on a disc shaft 90. The pressure disc 88 comprises a solid one-piece circular disk formed from a hard material such as metal, wood, plastic and the like. It is desired that the material selected to form the pressure disc be a tough lightweight material that is corrosion and chemically resistant. A preferred material is Delrin™ made by DuPont de Nemours, E.I. & Co. The pressure disc 88 has first beveled or sloping surface 90 that extends axially along an outside surface of the disc from a first end 92 to about a middle position, and a second flat surface 94 that extends from the beveled surface 90 to a second end 96. The beveled surface 90 serves to both promote water passage over the disc during passage of water through the valve and to provide a good seal against an edge portion of the annular passage 62 of the inlet body portion.

The pressure disc 88 includes an opening (not shown) that extends axially through the disc for accommodating placement of the disc shaft 90 therethrough. The second end 96 includes a recessed portion or counter bore (not shown) that is coaxial with the disc opening to accommodate placement of a bushing 98 therein.

In a preferred embodiment, the pressure disc 88 has a axial length of approximately one inch, a diameter across the flat surface 94 of approximately 2.5 inches, and a diameter across the first end 92 of approximately 2.1875 inches. The beveled surface 90 slopes radially inward from the flat surface 94 to the first end 92 at an angle of from 5 to 20 degrees. The opening has a diameter of approximately 0.375, and the counter bore has a diameter and depth of approximately 0.75 inches and 0.25 inches, respectively.

The pressure disc 88 is slidably positioned on the disc shaft 90. The disc shaft can be formed from any structurally rigid material such as steel, steel alloys and the like. It is desired that the material selected to form the disk shaft be corrosion and chemically resistant. A particularly preferred material is 303 stainless steel.

Moving from left to right in FIG. 3, a first end 100 of the disk shaft 90 has a reduced diameter section 102 that extends axially a distance along the shaft length. The reduced diameter section is sized to fit within the web opening 66 of the inlet body portion 54. The first end 100 has a threaded passage (not shown) that extends axially along a distance of the shaft. A bolt 104 is disposed through the web opening 66, is threadably engaged with the first end 100 of the shaft 90, and is tightened to fixedly attach the shaft to the inlet body portion 54. A washer 106 is interposed between the bolt head and the web 64.

A first bushing 108 is slidably disposed around an outside diameter of the shaft 90 and is interposed between the web 64 and the first end 92 of the pressure disc 88. A second bushing 98 is disposed around the diameter of the shaft and is interposed between the second end 96 of the disc 88 and a first spring retaining bushing 110. The second bushing has a diameter sized to fit within the recessed portion of the second end 96. The first spring retaining bushing 110 is disposed around the diameter of the shaft 90 and has an outside diameter greater than the diameter of a pressure spring 112. It is desired that the first spring retaining bushing have a reduced diameter section 111 sized that extends a distance into an inside diameter of the spring 112. In a preferred embodiment, the first bushing 108 has an outside diameter of approximately 0.875 inches and a length of approximately 0.56 inches. The second bushing 98 has an outside diameter of approximately 0.75 inches and a length of approximately 0.31 inches. The first spring retaining bushing 110 has an outside diameter of approximately 0.875 inches, and a reduced diameter section with a diameter of approximately 0.68 inches and a length of approximately 0.18 inches.

Alternatively, the second bushing 98 and first spring retaining bushing 110 may be formed as one integral bushing having three different diameter sections to facilitate placement within the recessed portion, to engage and retain an end portion of the spring, and to fit within the spring.

The spring 112 is disposed around the diameter of the shaft 90 and is interposed between the first spring retaining bushing 112 and a second spring retaining bushing 114. The second spring retaining bushing 114 is configured the same as the first spring retaining bushing and includes a reduced diameter section 116 disposed within the inner diameter of the spring. The reduced diameter sections 111 and 116 serve to center the spring about the shaft 90, thereby helping to prevent the spring from binding when compressed about the shaft. The second spring retaining bushing 114 is placed adjacent an enlarged diameter section 118 at a second end 119 of the shaft 90. The enlarged diameter section is sized larger than an inside diameter of the second spring retaining bushing 144 to prevent slidable displacement thereby. The second end 119 is configured having a tapered surface to facilitate water passage thereby.

The spring 112 may be formed from any conventional material. It is desired that the spring be formed from a material that has good corrosion and chemical resistance. In a preferred embodiment, the spring is formed from stainless steel. The spring tension, i.e. spring constant, will vary depending on the particular valve application, e.g., the desired range of foam to water ratio, the particular range of water flow rate and pressure, and the like. For example, in a valve application where up to one percent foam is desired at water flow rates up to 1000 GPM, a suitable spring may have a spring tension of approximately 14 pounds. In a preferred embodiment, the spring 112 has an outside diameter of approximately 0.87 inches, and inside diameter of approximately 0.75 inches, and a relaxed length of approximately 2.37 inches.

A third bushing 120 is disposed around the diameter of the shaft 90, is interposed between the first and second spring retaining bushings 110 and 114, and is positioned concentrically within the inside diameter of the spring 112. The third bushing 120 is sized having a length shorter than a relaxed length of the spring 112 to provide the pressure disc a desired amount of slidable travel on the shaft toward the second end 119. In a preferred embodiment, the third bushing 120 has an outside diameter of approximately 0.5 inches and a length of approximately 1.25 inches.

It is desired that each of the above-identified bushings be formed from a corrosion and chemical resistant material. In a preferred embodiment, each of the bushings are formed from brass.

When attached to the inlet body, pressure disc 88 of the first stage pressure regulating assembly 86 is positioned with a portion of the beveled surface 90 seated against the edge of the annular passage 62. In the seated position the first end 92 of the disc 88 does not block or otherwise impair the flow of water from the annular passage 62 to the high-pressure inlet port 72. The seated position of the disc during low pressure/low flow conditions ensures that an adequate supply of liquid is received by the high-pressure inlet port 72 to pressurize the foam dispersement device (not shown).

The central body portion 56 is generally cylindrical in shape and has an annular passage 122 therethrough, extending from a first end 124 to a second end 126. In a preferred embodiment, the annular passage 122 has an inside diameter of approximately 3.7 inches. The central body portion is formed from the same material used to form the inlet body portion. The first end 124 includes a number of holes 128 extending axially a distance therein. In a preferred embodiment, the first end 124 has six equidistant holes 128 that are threaded to accommodate threaded engagement with bolts 84. The inlet body portion 54 is attached to the central body portion 56 by placing an O-ring seal 130 within the groove 78 adjacent the second end 70 of the inlet body, and placing the edge 80 of the inlet body 54 against the first end 80 of the central body 56 and aligning the bolt openings 82 with the holes 128. Bolts 84 are inserted into the openings 82, threadably engaged within the holes 128, and tightened to a desired tightness. The O-ring seal may be formed from conventional sealing materials such as natural or synthetic rubber. A particularly preferred O-ring seal material is Viton™. The O-ring seal serves to provide a liquid-tight seal between the inlet and central body portions.

The second end 126 of the central body 56 includes a number of holes 131 extending axially a distance therein. In a preferred embodiment, the holes are threaded to accommodate threaded engagement with bolts 132 used to connect together the central and outlet body portions as described in greater detail below.

The outlet body portion 58 has a generally cylindrical outside surface and, in a preferred embodiment, is a two piece construction comprising a venturi portion 134 and a flange portion 136. In a preferred embodiment, the flange and venturi portions are fixedly attached together by welding. The flange and venturi portions are formed from the same material used to form the inlet and central body portions.

The venturi portion 134 includes an annular passage 138 that extends therethrough from a first end 140 to a second end 142. The second end may have an outside surface configured to accommodate connection with a number of different conventional hose or pipe fittings, such as those previously discussed for the inlet body. The annular passage 138 is shaped in the form of a modified venturi and is a second stage pressure regulator for the valve. The venturi is configured having a reduced diameter throat 146 positioned adjacent the first end 140. The venturi has a gradually increasing diameter as it approaches the second end 142. The venturi throat diameter is specific to the particular application of the valve, e.g., the desired foam to water ratio, the size of hosing or piping connected to the valve, the pressure and flow rate of the water, and the like. For example, in one application the venturi may have a throat diameter of approximately 1.35 inches for water flow rates up to approximately 800 GPM, and may have a throat diameter of approximately 1.5 inches for water flow rates up to approximately 1000 GPM. In a preferred embodiment, the venturi portion 134 has a length of approximately 3.5 inches and has an outside diameter of approximately 3.12 inches.

The venturi portion 134 includes a number of foam injection ports 148 that extend radially through a wall portion and are positioned adjacent the venturi throat 146. Each injection port 148 is hydraulically connected with each other injection port by an injection port manifold 150 that extends circumferentially around a reduced diameter section 152 of the venturi portion 134. The injection ports 148 are positioned adjacent the venturi throat to ensure complete mixing together of foam dispensed therefore with the water by the turbulent flow conditions produced by the venturi at the venturi throat. In a preferred embodiment, the venturi portion 134 includes approximately 8 foam injection ports 148 that are positioned equidistantly around the venturi throat. The injection ports 148 each have a diameter of approximately 0.25 inches.

The flange portion 136 includes a foam outlet port 154 that extends through a wall portion from an outside surface to an inside diameter 156. The inside diameter 156 is fitted against the diameter section 152 of the venturi portion 134 so that the foam outlet port 154 is aligned with the injection port manifold 150 to facilitate foam transport therethrough. In a preferred embodiment, the foam outlet port 154 is sized and configured the same as the high-pressure inlet port 72.

The flange portion 136 includes a first end 158 that is coterminating with the first end 140 of the venturi portion 134. The first end 158 extends radially from the venturi portion to a lip 160. The lip 160 is identical to the lip 76 in the inlet body 54 and includes a groove 162 that extends circumferentially around the lip 160. The flange portion 136 includes an edge 164 that extends radially from the groove 162 to an outside surface of the flange portion. In a preferred embodiment, the first end 158, the lip 160, the groove 162, and the edge 164 have the same dimensions as respective counterparts in the inlet body portion 54.

The flange portion 136 includes a number of bolt openings 166 that extend axially therethrough from third end portion 168 to the edge 164. In a preferred embodiment, the flange portion includes six bolt openings 166 spaced equidistantly apart. The outlet body portion 58 is fixedly attached to the central body portion 56 by placing an O-ring seal 170 into the groove 162, installing the lip 160 into the annular passage 122 until the edge 164 abuts against the second end 126. The outlet and central body portion are placed together such that the bolt openings 166 are aligned with holes 131. Bolts 132 are inserted through the openings 166 and are threadably engaged with the holes 131 and are tightened a desired amount. The O-ring seal is formed from the same material described for O-ring seal 130 and provides a liquid-tight seal between the outlet and central body portions.

Figure 5:
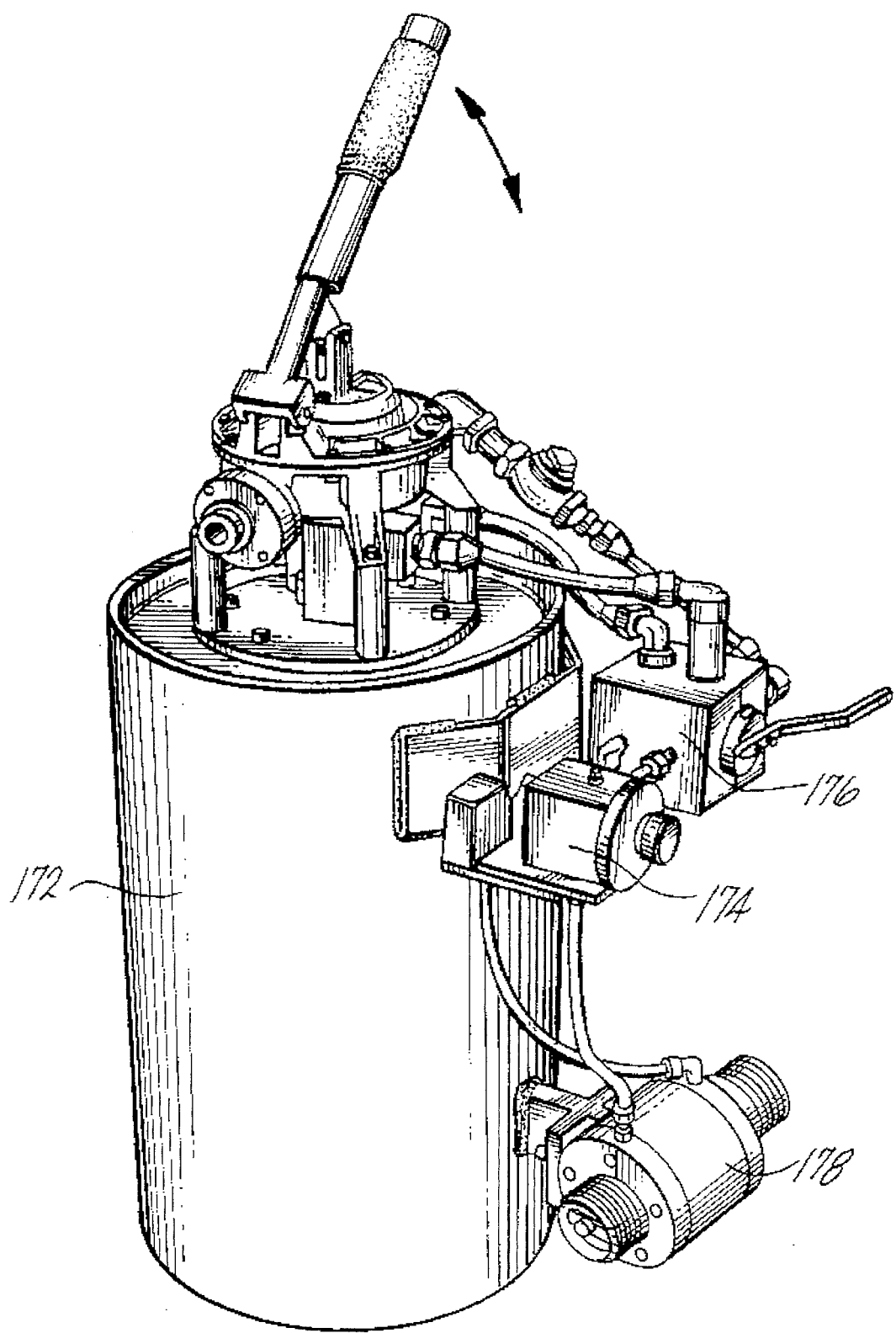
FIG. 5 is a perspective view of a foam delivery system incorporating use of the pressure balancing foam valve of FIG. 3.

A pressure balancing foam valve constructed according to principles of this invention can be used with a number of different foam delivery systems, such as that disclosed in U.S. Pat. No. 5,165,442, which is incorporated herein by reference, comprising a foam dispensing tank, a metering valve, and a three way selector valve. FIG. 5 illustrates an example of a foam delivery system comprising a foam dispensing tank 172, a metering valve 174, a three way selector valve 176, and the pressure balancing foam valve 178 of this invention. The valve provides consistently increasing or decreasing differential pressure between the high-pressure inlet port 72 and the foam outlet port 154 by the combined operation of the first stage pressure regulating system, i.e., action of the pressure disc, and the second stage pressure regulator, i.e., the venturi, to ensure accurate foam delivery at a constant and predictable foam to water ratio at a variety of different liquid volumetric flow rates.

Figure 6A:
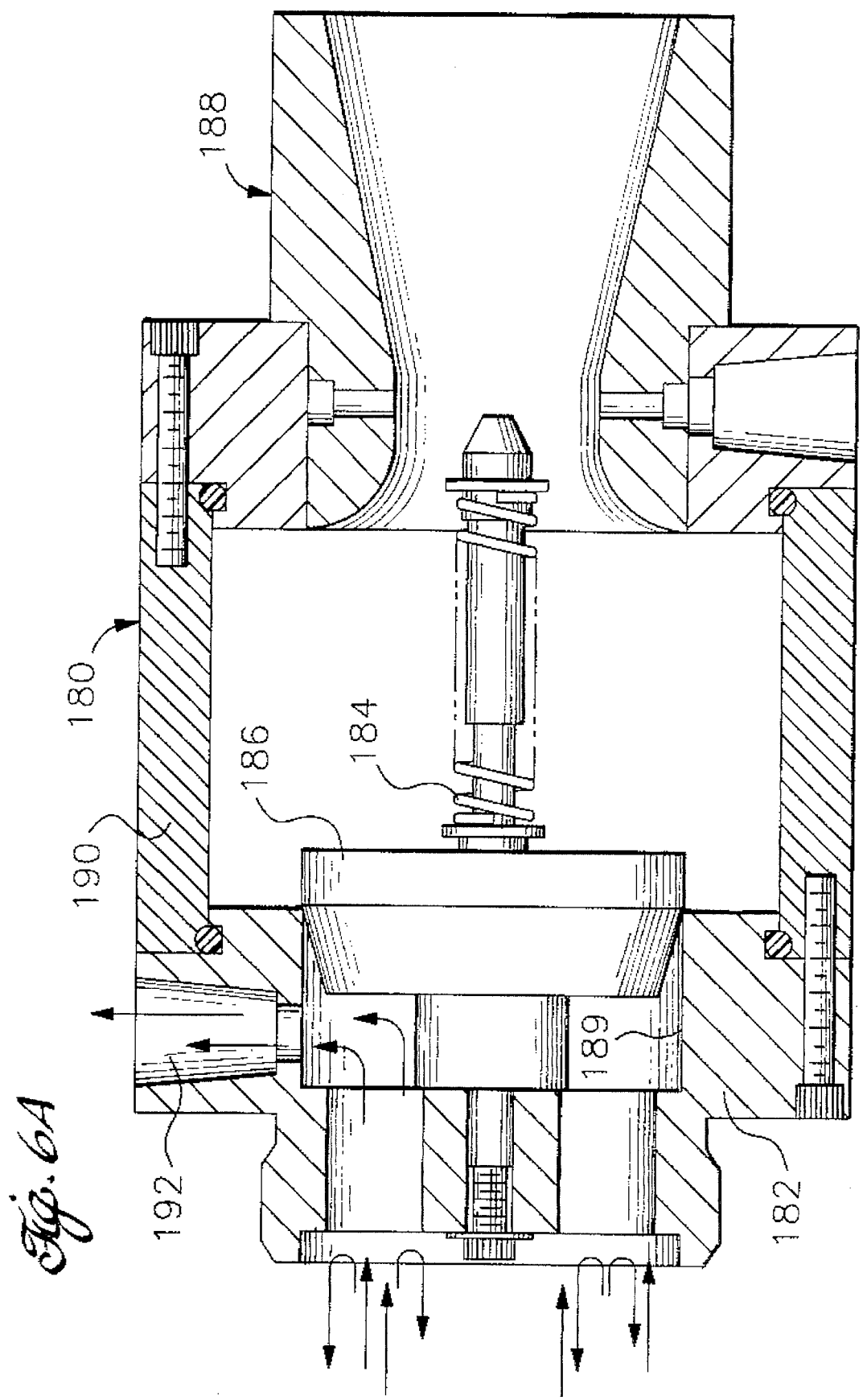
Figure 66:
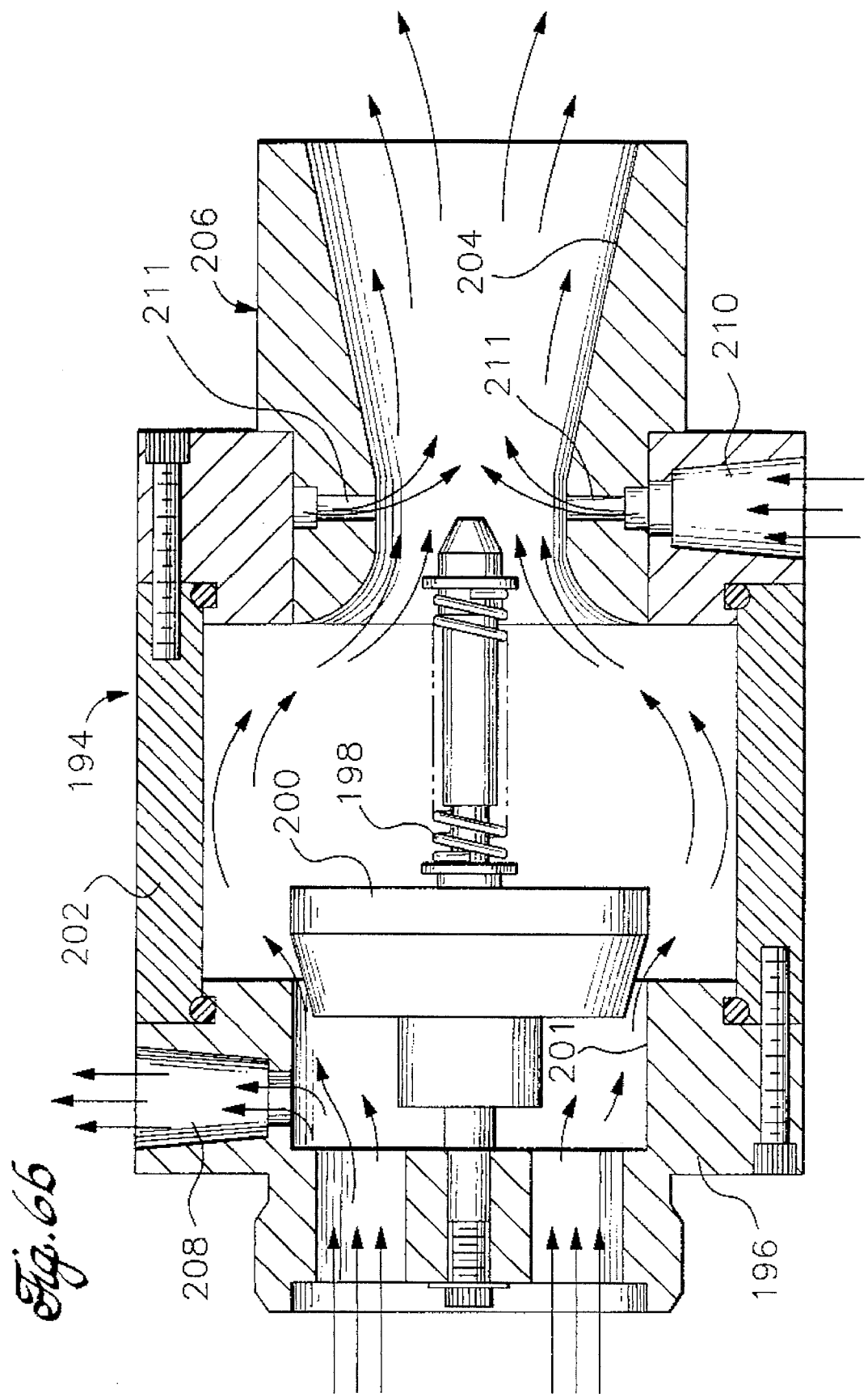

Referring now to FIG. 6a, the valve 180 is shown in a low pressure no liquid flow condition, where the liquid entering the inlet body portion 182 is at a pressure below a threshold pressure needed to overcome the compression force of the spring 184 and move the pressure disc 186 toward the outlet body portion 188. Under such low pressure conditions, the pressure disc remains seated against the edge of the annular passage 189 and, thereby, acts as a check valve to prohibit water from entering the central body portion 190 and passing through the valve. The water that enters the inlet body portion 182 is allowed to flow unobstructed to the high-pressure inlet port 192 where it is transported to a foam tank and is used to pressurize foam contained therein.

Referring now to FIG. 6b, the valve 194 is shown in a low flow condition, where the water entering the inlet body portion 196 is at pressure sufficient to overcome the threshold compression force of the spring 198, causing the pressure disc 200 to be moved away from its seated engagement with the edge of the annular passage 201 inlet body. Under such conditions, the water is allowed to flow around the disc 200, enter the central body portion 202 and flow through the venturi 204 and flow out of the outlet body portion 206. Under such low flow conditions, the first stage pressure regulating assembly, i.e., the pressure disc, acts to provide a desired pressure differential between the high-pressure inlet port 208 and the foam outlet port 210. The second stage pressure regulator, i.e., the venturi, also acts to a lessor degree to provide a pressure differential within the valve. For example, at a water flow rate of up to about 150 GPM, the pressure disc acts as the primary mechanism for providing a desired pressure differential within the valve. At a water flow rate of approximately 150 GPM the contribution from the venturi in producing a desired differential pressure with the valve increases. As the flow rate and pressure of the water entering the valve continues to increase, the contribution by the venturi in providing the desired pressure differential increases and the contribution by the pressure disc levels off. The differential pressure is used to pressurize foam contained within a foam dispensing tank. The pressurized foam is dispensed into the valve via the foam outlet port 210, and is dispensed into the water stream via the plurality of foam injection ports 211.

Referring to new FIG. 6c, the valve 212 is shown in a high flow condition, wherein the water entering the inlet body portion 214 is at a pressure sufficient to overcome the compression force of the spring 216 and cause the pressure disc 217 to be moved to a maximum position on the shaft 218 toward the outlet body portion 220. Under these conditions, the differential pressure contribution by the first stage pressure regulating assembly, i.e., the pressure disc, is at a maximum and the venturi 222 acts to provide the remaining differential pressure needed to effect dispersement of a constant proportion of foam into the water stream.

A key feature of this invention is the venturi shaped annular passage that is positioned within the outlet body portion because of its ability to produce a controlled and predictable increasing differential pressure in the valve as the water flow rate and pressure entering the valve reaches high levels where the differential pressure contribution from the spring-controlled pressure disc levels off, i.e., where the pressure disc is no longer able to produce by itself a proportionally increasing differential pressure. The use of such a pressure disc and venturi mechanism in producing a desired differential pressure within the valve eliminates the inherent uncontrollability and inaccuracies associated with a pressure disc/spring controlled only type mechanism. The contribution of the venturi ensures that a desired pressurizing force is imposed on the foam tank to effect accurate dispersement of a constant proportion of foam to water at increasing flow rates.

Table 1 summarizes test data gathered from using pressure balancing foam valves having increasing orifice sizes, constructed according to principles of this invention, to dispense Class A foam into a stream of water. In these tests the desired proportion of foam to water was set on a metering valve to be 0.5 percent, and the actual amount of foam that was dispensed into the water was measured.

TABLE 1

| ORIFICE SIZE | GPM | NOZZLE PSI | FOAM SETTING | FOAM ACTUAL |
|---|---|---|---|---|
| ¼" | 22.5 | 150 | .5 | .56 |
| ⅜" | 50 | 150 | .5 | .60 |
| ½" | 90 | 150 | .5 | .50 |
| ⅝" | 126 | 120 | .5 | .41 |
| ¾" | 166 | 100 | .5 | .48 |
| ¾" | 200 | 145 | .5 | .60 |
| ⅞" | 249 | 120 | .5 | .64 |
| 1" | 295 | 100 | .5 | .64 |
| 1⅛" | 355 | 90 | .5 | .66 |
| 1⅛" | 401 | 115 | .5 | .66 |
| 1¼" | 452 | 96 | .5 | .64 |
| 1¼" | 505 | 120 | .5 | .64 |

The data in Table 1 illustrates the ability of the valve to produce a predictable and controlled differential pressure to dispense foam throughout a wide range of various water flow rates, i.e., below and above 150 GPM, and yet maintain a good level of foam dispersement accuracy at a low foam to water ratios.

Table 2 summarizes test data gathered from using a pressure balancing foam valve of a constant orifice size, constructed according to principles of this invention, to dispense Class A foam into a stream of water. In these tests the flow rate and pressure of the water entering the valve was increased, the proportion of foam to be dispensed into the water stream was set on a metering valve to be 3 percent, and the actual amount of foam that was dispensed was measured.

TABLE 2

| | Metering Valve set at 3% | |
|---|---|---|
| GPM/Flow | Pressure (PSI) | Actual Form |
| 100 | 76 | 3.25 |
| 200 | 78 | 3.15 |
| 100 | 100 | 3.1 |
| 200 | 100 | 3.2 |

The data from Table 2 illustrates the ability of the valve to produce a predictable and controlled differential pressure within the valve to dispense foam at increasing water flow rates while maintaining a high level of foam dispersement accuracy at a high foam to water ratio.

Table 3 summarizes test data gathered from using a pressure balancing foam valve of a constant orifice size, constructed according to principles of this invention, to dispense Class A foam into a stream of water. In these tests the flow rate of the water entering the valve was increased, the pressure of the water was varied, the proportion of foam to water was set on a metering valve to be 0.4 percent, the pressure differential within the valve was measured and the actual amount of foam that was dispensed was measured.

TABLE 3

| | Metering Valve Setting - 4% | |
|---|---|---|
| GPM/Flow | in Pressure out | Foam |
| 2 | 125 123 | .37 |
| 5 | 124 122 | .34 |
| 10 | 124 120 | .35 |
| 15 | 124 119 | .37 |
| 20 | 119 117 | .37 |
| 25 | 118 117 | .30 |
| 50 | 119 114 | .33 |
| 100 | 107 100 | .30 |
| 150 | 225 210 | .31 |
| 200 | 175 174 | .34 |
| 275 | 80 36 | .35 |

The data gathered from Table 3 illustrates the ability of the valve to produce a predictable and controlled differential pressure to dispense foam at increasing water flow rates while maintaining a high level of foam dispersement accuracy at a low foam to water ratio at both low and high flow rates.

The pressure balancing foam valve constructed according to principles of this invention can be used to accurately dispense Class A foam into a stream of water at foam proportions as low as 0.05 percent to as high as 10 percent, depending on the water flow rate.

Although the valve has been specifically described as being used for dispensing Class A foam into a water stream, it is to be understood that the valve constructed according to principles of this invention may be used to dispense other types of fire fighting foams, e.g., Class B foam, or may be used to dispense foams that have applications other than fire fighting, e.g., foams used for oil spill clean up, foams used for structure preservation or the like. Additionally, although the valve has been described as being used to dispose foam into a water stream it is to be understood that this valve can be used with liquids other than water.

Additionally, although specific dimensions have been provided for a preferred embodiment of the valve, it is to be understood that such dimensions reflect but one example of a valve constructed according to principles of this invention and have been provided for purposes of clarity, reference and enablement and are not intended to be limiting.

Although specific embodiments of the pressure balancing foam valve have been specifically described and illustrated herein, many modifications and variations will be apparent to those skilled in the art. Accordingly, it is to be understood that, within the scope of the appended claims, the pressure balancing foam valve according to principles of this invention may be embodied other than as specifically described herein.

What is claimed is:

1. A valve apparatus comprising:

a body having an liquid inlet at one end and a liquid outlet at an opposite end, and having an annular passage therethrough;

a first stage pressure regulating assembly attached adjacent the liquid inlet comprising:

a shaft extending axially within the annular passage, wherein the shaft is attached at a first end to the body adjacent the liquid inlet;

a one-piece pressure disc having a central opening therethrough for slidable movement on the shaft;

a spring interposed between the pressure disc and a second end of the shaft for urging the pressure disc into a seated position against an end of the liquid inlet annular passage at low flow conditions, wherein the spring is proportioned in strength to permit compression of the spring by force of the pressure disc from increasing liquid pressure to unseat the pressure disc and permit liquid flow through the annular passage and the valve; and a second stage pressure regulator comprising a venturi-shaped annular passage through the liquid outlet, wherein the pressure disc and venturi together act to provide a differential pressure within the valve.

2. The valve apparatus as recited in claim 1 wherein the liquid inlet comprises a high-pressure inlet port extending from the annular passage to an outside surface, wherein in a seated condition the high-pressure inlet port is unrestricted by the pressure disc.

3. The valve apparatus as recited in claim 1 wherein the body comprises a web at the liquid inlet that extends across a diameter of the annular passage, and wherein the first end of the shaft is fixedly attached to the web.

4. The valve apparatus as recited in claim 1 wherein the pressure disc comprises:

a beveled outside surface that extends a distance along an axis running through the central opening from a first disc end facing toward the liquid inlet, wherein a portion of the beveled surface is larger in diameter than the annular passage to facilitate seated placement of the beveled surface against the end of the annular passage; and a flat outside surface that extends from the beveled surface to a second disc end facing toward the liquid outlet.

5. The valve apparatus as recited in claim 1 wherein the first stage pressure regulating assembly comprises a number of bushings disposed on the shaft to center the pressure disc and the spring on the shaft.

6. The valve apparatus as recited in claim 1 wherein the liquid outlet comprises:

a plurality of foam injection ports that extend radially through a wall portion from the venturi-shaped annular passage;

a foam injection port manifold disposed within the wall portion of the liquid outlet and in hydraulic communication with the foam injection ports; and a foam outlet port extending through the wall portion of the liquid outlet from the foam injection port manifold to an outside surface.

7. The valve apparatus as recited in claim 6 wherein the foam injection ports are positioned at equidistant locations around a throat portion of the venturi.

8. A pressure balancing valve comprising:

a three-piece body comprising:
  an inlet body portion having an annular passage extending therethrough;
  a central body portion having an annular passage extending therethrough;
  an outlet body portion having an annular passage extending therethrough, wherein the central body is interconnected between the inlet and outlet body portions, and wherein the annular passages are coaxial with one other;

a first stage pressure regulating assembly axially disposed within the annular passage of the valve body comprising:
  a shaft extending axially within the annular passage that is mounted at a first end to the inlet body;
  a one-piece pressure disc having a central opening therethrough for slidable movement on the shaft;
  a spring interposed between the pressure disc and a second end of the shaft for urging the pressure disc into a seated position against an end of the inlet body annular passage, wherein the spring is selected to permit compression of the spring by the pressure disc from force of increasing liquid pressure to unseat the pressure disc and permit liquid flow through the annular passage and the valve; and a second stage pressure regulator comprising a venturi-shaped annular passage through the outlet body, wherein the pressure disc and venturi together act to provide a differential pressure within the valve.

9. The pressure balancing valve as recited in claim 8 wherein pressure disc comprises:

a beveled outside surface that extends a distance from a first disc end facing toward the inlet body, wherein a portion of the beveled surface is larger in diameter than the annular passage through the inlet body to facilitate seated placement of the beveled surface thereon; and a flat outside surface that extends from the beveled surface to a second disc end facing toward the outlet body.

10. The pressure balancing valve as recited in claim 8 wherein the outlet body comprises:

a plurality of foam injection ports that extend radially into the outlet body from a wall surface of the venturi;

a foam injection port manifold disposed within the outlet body and in hydraulic communication with the foam injection ports; and a foam outlet port extending through the outlet body from the foam injection port manifold to an outside surface.

11. The pressure balancing valve as recited in claim 10 wherein the foam injection ports are positioned at equidistant locations around a throat portion of the venturi.

12. The pressure balancing valve as recited in claim 8 wherein the inlet body comprises a web that extends across a diameter of the annular passage, and wherein the first end of the shaft is attached to the web.

13. The pressure balancing valve as recited in claim 8 wherein the first stage pressure regulating assembly comprises:

at least one bushing disposed on the shaft to center the pressure disc and the spring on the shaft; and spring retaining means for retaining the spring on the shaft.

14. The pressure balancing valve as recited in claim 8 wherein the inlet body comprises a high-pressure inlet port extending radially through the inlet body from the annular passage to an outside surface, and wherein the high-pressure inlet port is positioned so that it is not restricted by the pressure disc when in a seated position.

15. A pressure balancing valve comprising:

a three-piece body comprising:
  an inlet body portion having an annular passage extending therethrough and having a web portion extending diametrically across the annular passage, and having a high-pressure inlet port extending radially through the inlet body from the annular passage to an outside surface;
  a central body portion connected at a first end to the inlet body and having an annular passage extending therethrough;
  an outlet body portion connected to a second end of the central body portion and having a venturi-shaped annular passage extending therethrough for providing a differential pressure within the valve;

a pressure disc disposed within the annular passage of the valve body;

a shaft disposed axially within the annular passage of the valve that is attached at a first end to the web portion of the inlet body, wherein the pressure disc has a central opening therethrough to accommodate slidable placement on the shaft; and a spring interposed between the pressure disc and a second end of the shaft for urging the pressure disc into a seated position against an end of the inlet body annular passage, wherein the spring is selected to permit compression by the pressure disc from force of increasing liquid pressure rate, and wherein the pressure disc and venturi together act to provide a differential pressure within the valve.

16. The pressure balancing valve as recited in claim 15 wherein pressure disc comprises:

a beveled outside surface that extends a distance from a first disc end facing toward the inlet body, wherein a portion of the beveled surface is larger in diameter than the annular passage through the inlet body to facilitate seated placement of the beveled surface thereon; and a flat outside surface that extends from the beveled surface to a second disc end facing toward the outlet body.

17. The pressure balancing valve as recited in claim 16 wherein the outlet body comprises:

a plurality of foam injection ports that extend radially into the outlet body from a wall surface of the venturi;

a foam injection port manifold disposed within the outlet body and in hydraulic communication with the foam injection ports; and a foam outlet port extending through the outlet body from the foam injection port manifold to an outside surface.

18. The pressure balancing valve as recited in claim 17 wherein the foam injection ports are positioned at equidistant locations around a throat portion of the venturi.

19. A method for producing a differential pressure within a valve comprising the steps of:

passing liquid that enters an inlet portion of the valve through an annular passage and over a slidably displacable pressure disc, wherein the position of the pressure disc within the annular passage is controlled by a spring means acting to urge the pressure disc into a seated condition against an edge portion of the passage to prohibit flow therethrough, wherein the pressure disc is unseated and moved axially away from the inlet portion with increasing liquid pressure, wherein a differential pressure between the inlet portion and an outlet portion of the valve is produced by action of pressure disc restricting flow of liquid through the valve; and passing liquid through an annular passage of an outlet portion of the valve shaped in the form of a venturi, wherein a differential pressure between the inlet portion and outlet portion of the valve is produced by action of the venturi restricting flow of liquid through the valve, wherein the pressure disc and venturi act together to produce a differential pressure within the valve.

\* \* \* \* \*